US008076899B2

(12) United States Patent
Uehama et al.

(10) Patent No.: US 8,076,899 B2
(45) Date of Patent: Dec. 13, 2011

(54) VALVE TIMING CONTROL APPARATUS

(75) Inventors: Motoki Uehama, Kariya (JP); Yasushi Morii, Nagoya (JP)

(73) Assignee: Denso Corporation, Kariya (JP)

( * ) Notice: Subject to any disclaimer, the term of this patent is extended or adjusted under 35 U.S.C. 154(b) by 520 days.

(21) Appl. No.: 12/266,652

(22) Filed: Nov. 7, 2008

(65) Prior Publication Data

US 2009/0121671 A1 May 14, 2009

(30) Foreign Application Priority Data

Nov. 13, 2007 (JP) ................................ 2007-294725

(51) Int. Cl.
*H02P 27/04* (2006.01)

(52) U.S. Cl. ........ 318/809; 318/599; 318/807; 318/767; 318/727

(58) Field of Classification Search .................. 318/809, 318/807, 767, 727
See application file for complete search history.

(56) References Cited

U.S. PATENT DOCUMENTS

| | | | | |
|---|---|---|---|---|
| 6,060,859 | A * | 5/2000 | Jonokuchi | 318/801 |
| 6,064,163 | A * | 5/2000 | Yoshida et al. | 318/400.34 |
| 6,953,013 | B2 * | 10/2005 | Tani | 123/90.17 |
| 7,077,087 | B2 * | 7/2006 | Tani | 123/90.17 |
| 7,089,897 | B2 | 8/2006 | Schafer et al. | |
| 7,440,827 | B2 * | 10/2008 | Kawada et al. | 701/22 |
| 2008/0083384 | A1 | 4/2008 | Morii | |

FOREIGN PATENT DOCUMENTS

| | | |
|---|---|---|
| JP | 2000-170513 | 6/2000 |
| JP | 2004-350446 | 12/2004 |

* cited by examiner

*Primary Examiner* — Walter Benson
*Assistant Examiner* — David Luo
(74) *Attorney, Agent, or Firm* — Nixon & Vanderhye P.C.

(57) ABSTRACT

An electric power supply driver executes duty control of turning on and off of a selected switching element to supply electric power to a corresponding stator coil in a case where an actual rotational direction and a target rotational direction of a motor shaft coincide with each other. Furthermore, the driver sets an on-duty ratio of the selected switching element below a lower limit value, which is at least required to rotate the motor shaft through the power supply to each corresponding stator coil in a case where the actual rotational direction and the target rotational direction do not coincide with each other.

6 Claims, 8 Drawing Sheets

FIG. 7

| POWER SUPPLY PATTERN | DRIVE SIGNAL | | | | | |
|---|---|---|---|---|---|---|
| | UPPER SIDE | | | LOWER SIDE | | |
| | FU | FV | FW | GU | GV | GW |
| i | H | L | L | L | P | L |
| ii | H | L | L | L | L | P |
| iii | L | H | L | L | L | P |
| iv | L | H | L | P | L | L |
| v | L | L | H | P | L | L |
| vi | L | L | H | L | P | L |

FIG. 8

| POWER SUPPLY PATTERN | DRIVE SIGNAL | | | | | |
|---|---|---|---|---|---|---|
| | UPPER SIDE | | | LOWER SIDE | | |
| | FU | FV | FW | GU | GV | GW |
| i | L | H | L | P | L | L |
| ii | L | L | H | P | L | L |
| iii | L | L | H | L | P | L |
| iv | H | L | L | L | P | L |
| v | H | L | L | L | L | P |
| vi | L | H | L | L | L | P |

FIG. 9
| | | ACTUAL ROTATIONAL DIRECTION Dr | |
|---|---|---|---|
| | | NORMAL DIRECTION | REVERSE DIRECTION |
| TARGET ROTATIONAL DIRECTION Dt | NORMAL DIRECTION | Don=VARIABLE | Don=Dons |
| | REVERSE DIRECTION | Don=Dons | Don=VARIABLE |
FIG. 10
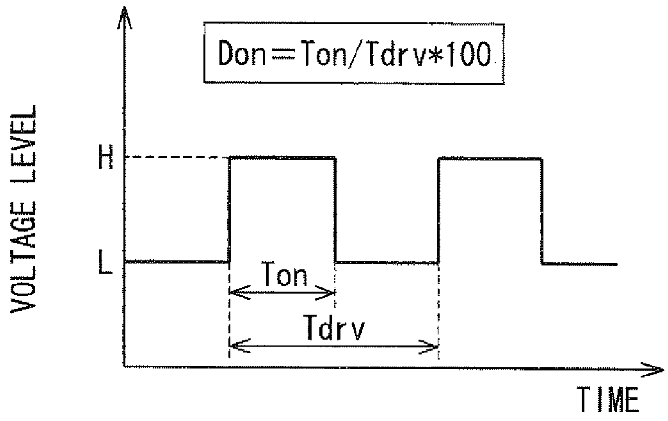
FIG. 11
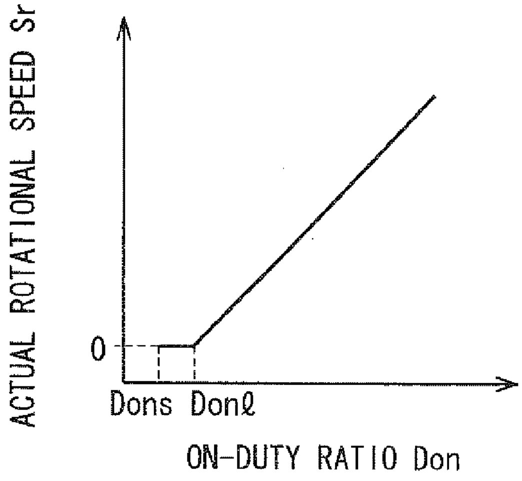

VALVE TIMING CONTROL APPARATUS

CROSS REFERENCE TO RELATED APPLICATION

This application is based on and incorporates herein by reference Japanese Patent Application No. 2007-294725 filed on Nov. 13, 2007.

BACKGROUND OF THE INVENTION

1. Field of the Invention

The present invention relates to a valve timing control apparatus that controls valve timing of at least one valve of an internal combustion engine, which is driven by a camshaft through transmission of a torque from a crankshaft of the internal combustion engine.

2. Description of Related Art

One previously proposed valve timing control apparatus uses a phase adjusting mechanism, which is connected to a motor shaft of an electric motor, to adjust a relative phase (hereinafter, referred to as an engine phase) between a crankshaft and a camshaft according to a rotational state of the motor shaft. For example, Japanese Unexamined Patent Publication No. 2004-350446 teaches a valve timing control apparatus, in which switching elements are connected to stator coils of an electric motor that generate a magnetic field upon energization thereof. When the switching elements to be turned on are sequentially changed, the motor shaft, on which the generated magnetic field is applied, is rotated. In this way, the motor shaft is rotated according to the on/off control of the switching elements, so that the valve timing, which is determined by the engine phase, can be appropriately adjusted in response to the operational state of the internal combustion engine.

In the valve timing control apparatus recited in Japanese Unexamined Patent Publication No. 2004-350446, the motor shaft is rotated in the generated magnetic field of the stator coils, so that the induced voltage is generated in the stator coils. At this time, in a case where an actual rotational direction of the motor shaft coincides with a target rotational direction of the motor shaft, which is used to determine the switching order of the switching elements to be turned on, an induced voltage is generated in an opposite direction that is opposite from that of the applied voltage, which is applied to the stator coil through the turning on of the switching element. In this way, the electric current, which corresponds to a difference between the applied voltage and the induced voltage, flows through the corresponding on-state switching element, which is placed in the on-state.

In contrast, in a case where the actual rotational direction of the motor shaft does not coincide with the target rotational direction of the motor shaft, an induced voltage is generated in the same direction as that of the applied voltage, which is applied to the stator coil through the turning on of the corresponding switching element. In this way, the relatively large electric current, the amount of which corresponds to the sum of the applied voltage and the induced voltage, continuously flows through the on-state switching element that is placed in the on-state. Therefore, this switching element may be excessively heated to cause a thermal failure of the switching element.

SUMMARY OF THE INVENTION

The present invention is made in view of the above disadvantage. Thus, it is an objective of the present invention to provide a valve timing control apparatus, which can implement appropriate adjustment of the valve timing while effectively limiting a thermal failure. To achieve the objective of the present invention, there is provided a valve timing control apparatus that controls valve timing of at least one valve of an internal combustion engine, which is driven by a camshaft upon transmission of a torque from a crankshaft of the internal combustion engine to open and close the at least one valve. The valve timing control apparatus includes an electric motor, a plurality of switching elements, an electric power supply driving means and a phase adjusting mechanism. Each of the plurality of stator coils generates a magnetic field upon energization thereof. The motor shaft is driven to rotate by action of the magnetic field of each corresponding one of the plurality of stator coils. Each of the plurality of switching elements is connected to a corresponding one of the plurality of stator coils. The electric power supply driving means is for driving the motor shaft by sequentially changing at least one on-state switching element to be turned on among the plurality of switching elements to supply electric power to each corresponding one of the plurality of stator coils. The phase adjusting mechanism adjusts a relative phase between the crankshaft and the camshaft in response to a rotational state of the motor shaft. The electric power supply driving means executes duty control of turning on and off of a selected switching element, which is selected from the at least one on-state switching element, to supply the electric power to the corresponding one of the plurality of stator coils in a case where an actual rotational direction of the motor shaft and a target rotational direction of the motor shaft coincide with each other. The electric power supply driving means sets an on-duty ratio of the selected switching element below a lower limit value, which is at least required to rotate the motor shaft through the power supply to each corresponding one of the plurality of stator coils in a case where the actual rotational direction of the motor shaft and the target rotational direction of the motor shaft do not coincide with each other.

BRIEF DESCRIPTION OF THE DRAWINGS

The invention, together with additional objectives, features and advantages thereof, will be best understood from the following description, the appended claims and the accompanying drawings in which:

FIG. 7 is a schematic diagram showing power supply patterns of an electric power supply driver of FIG. 6 used in a case where a target rotational direction of a motor shaft is a normal rotational direction;

FIG. 8 is another schematic diagram showing power supply patterns of the electric power supply driver used in a case where the target rotational direction of the motor shaft is a reverse rotational direction;

FIG. 9 is a schematic diagram showing setting of an on-duty ratio of the electric power supply driver;

FIG. 10 is a schematic diagram for describing the on-duty ratio of the electric power supply driver; and FIG. 11 is a schematic diagram showing a relationship between an actual rotational speed of the motor shaft and the on-duty ratio.

DETAILED DESCRIPTION OF THE INVENTION

Figure 1:
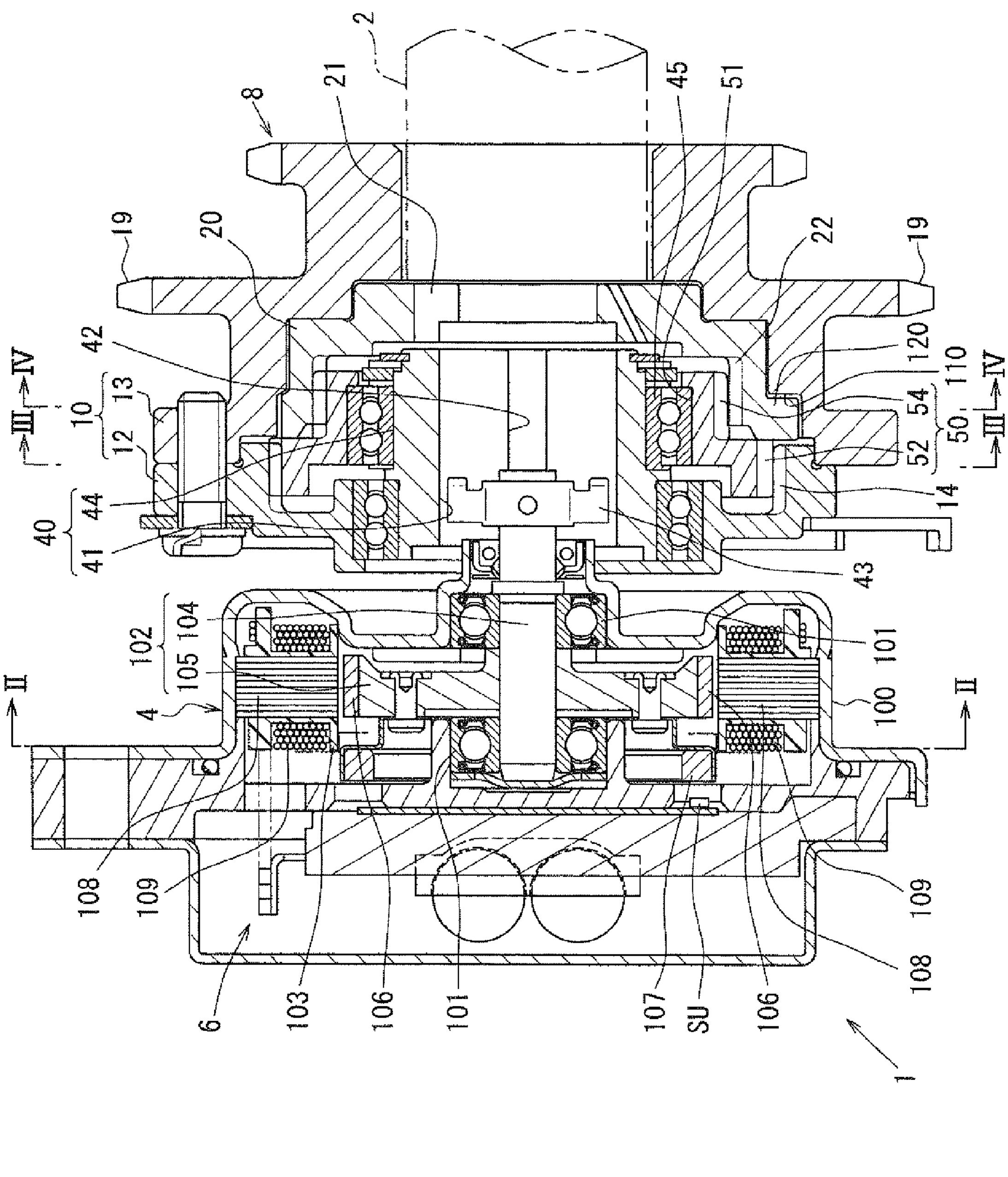
FIG. 1 is a cross sectional view taken along line I-I in FIG. 3, showing a basic structure of a valve timing control apparatus according to an embodiment of the present invention.

FIG. 1 shows a valve timing control apparatus 1 according to an embodiment of the present invention. The valve timing control apparatus 1 is installed in a vehicle and is placed in a transmission system, which transmits an engine torque from a crankshaft (not shown) of an internal combustion engine to a camshaft 2. The camshaft 2 of the present embodiment drives intake valves (not shown) among valves of the internal combustion engine to open and close the same. The valve timing control apparatus 1 adjusts the valve timing of the intake valves.

Hereinafter, a basic structure of the valve timing control apparatus 1 will be described.

The valve timing control apparatus 1 includes an electric motor 4, an electric power supply control circuit unit 6 and a phase adjusting mechanism 8. The valve timing control apparatus 1 changes, i.e., adjusts the valve timing, which is determined by a relative phase (referred to as an engine phase) between the crankshaft and the camshaft 2.

Figure 2:
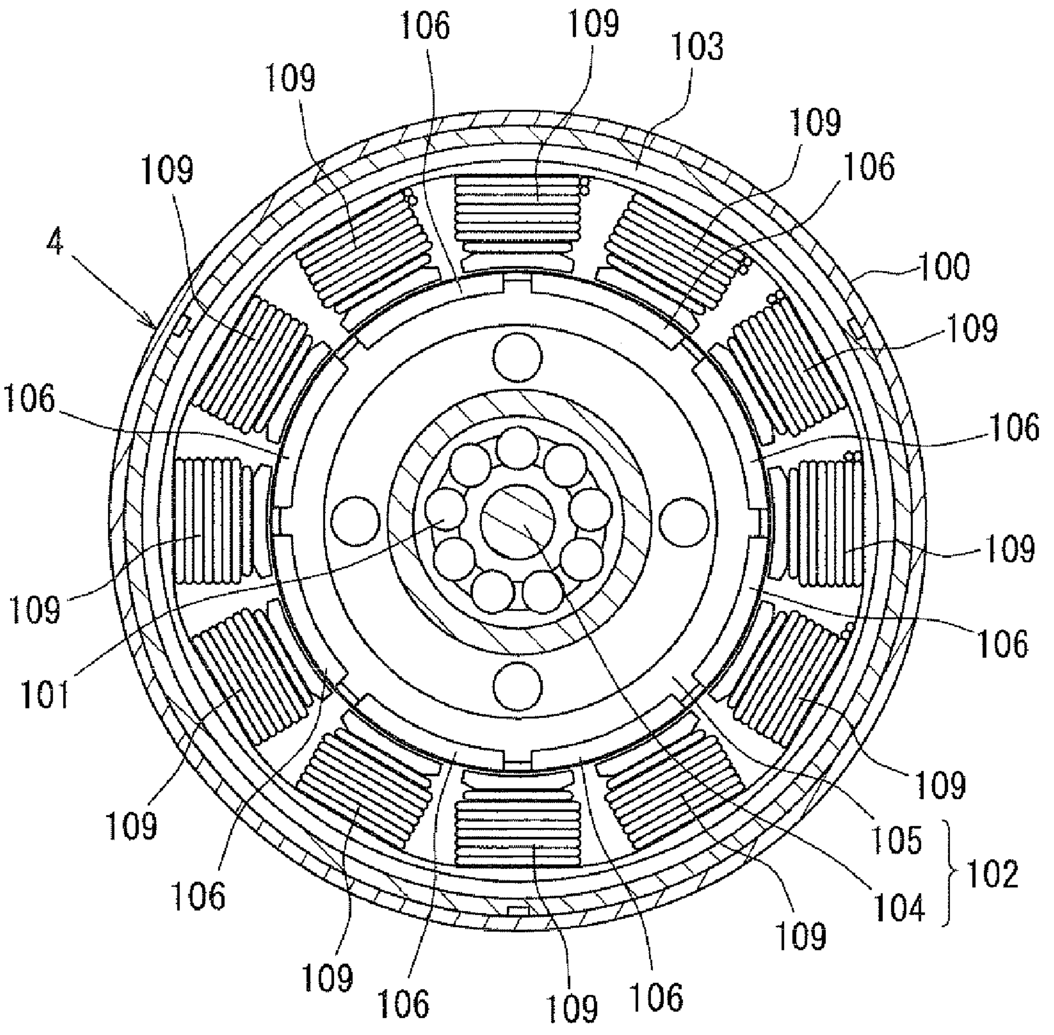
FIG. 2 is a cross sectional view taken along line II-II in FIG. 1.

As shown in FIGS. 1 and 2, the electric motor 4 is a brushless permanent magnet synchronous motor and includes a motor case 100, a couple of bearings 101, a motor shaft 102 and a motor stator 103. The motor case 100 is installed to a stationary component (e.g., a chain case) of the internal combustion engine. The couple of bearings 101 and the motor stator 103 are securely received in an interior of the motor case 100. The bearings 101 rotatably support a shaft main body 104 of the motor shaft 102 A rotor 105 of the motor shaft 102 is made of a magnetic material and is configured into an annular disk body, which radially outwardly projects from the shaft main body 104. A plurality of permanent magnets 106 is provided to the rotor 105 such that the magnets 106 are arranged one after another at equal intervals in a rotational of the motor shaft 102. Thereby, the permanent magnets 106 are rotatable integrally with the motor shaft 102 in a normal rotational direction and a reverse rotational direction. Each adjacent two of the permanent magnets 106 form magnetic poles of opposite polarities at a radially outer part of the rotor 105. The motor stator 103 is placed radially outward of the rotor 105 and includes a stator core 108 and stator coils 109. The stator core 108 is formed by stacking a plurality of metal pieces. Salient poles of the stator core 108 are arranged one after another at generally equal intervals in the rotational direction of the motor shaft 102. The stator coils 109 are wound around the corresponding salient poles of the stator core 108.

The electric power supply control circuit unit 6 of FIG. 1 is electrically connected to the stator coils 109 of the electric motor 4 and controls the electric power supply to the stator coils 109 based on the operational state of the internal combustion engine. When the electric power supply control circuit unit 6 controls the electric power supply to the stator coils 109, the corresponding stator coils 109 are excited to generate the corresponding magnetic flied applied to the permanent magnets 106, and thereby the motor shaft 102 is rotated in the clockwise direction or the counterclockwise direction in FIG. 2. In the present embodiment, the clockwise direction and the counterclockwise direction in FIG. 2 are referred to as the normal rotational direction (also simply referred to as a normal direction) and the reverse rotational direction (also simply referred to as a reverse direction), respectively, for the descriptive purpose.

As shown in FIG. 1, the phase adjusting mechanism 8 includes a driving-side rotator 10, a driven-side rotator 20, a planetary carrier 40 and a planetary gear 50.

Figure 3:
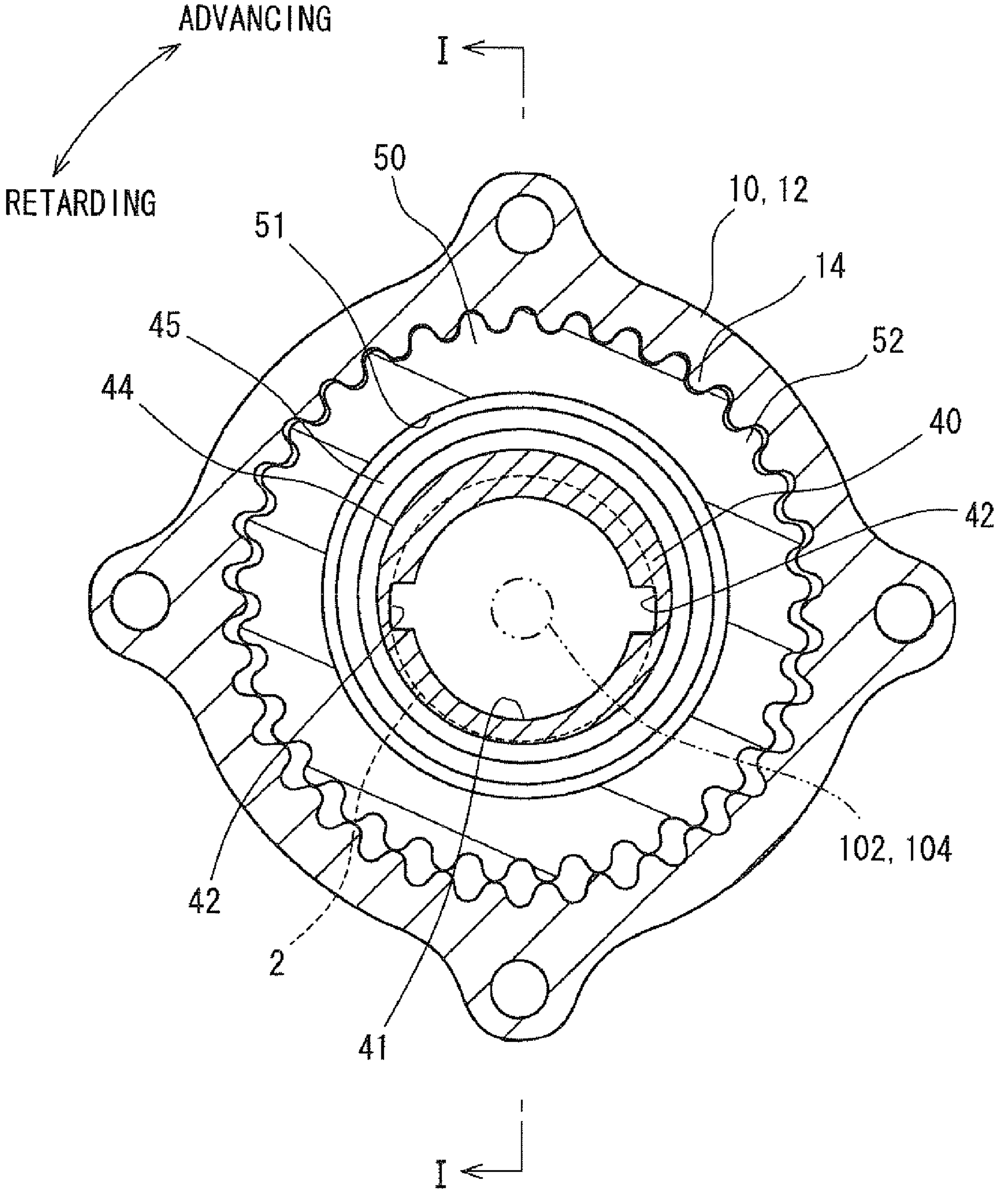
FIG. 3 is a cross sectional view taken along line III-III in FIG. 1.
Figure 4:
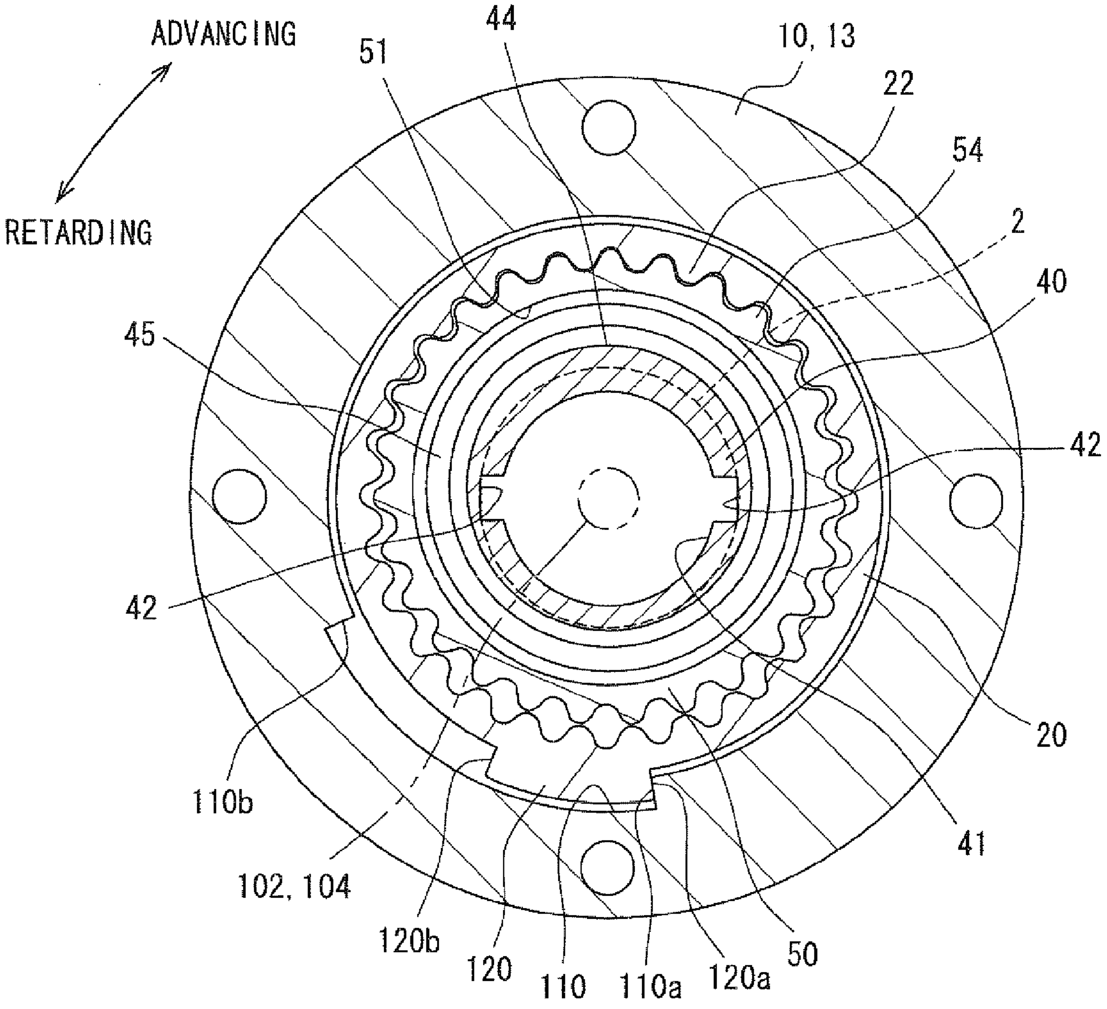
FIG. 4 is a cross sectional view taken along line IV-IV in FIG. 1.

As shown in FIGS. 1, 3 and 4, the driving-side rotator 10 includes a gear member 12 and a sprocket 13, which are coaxially fixed with screws. Other components 20, 40, 50 of the phase adjusting mechanism 8 are received inside of the gear member 12 and the sprocket 13. A peripheral wall of the cylindrical gear member 12 forms a driving-side internal gear portion 14, which has an addendum circle on a radially inner side of a deddendum circle thereof.

A peripheral wall of the cylindrical sprocket 13 has a plurality of radially outwardly projecting teeth 19, which are arranged one after another in the rotational direction. An annular timing chain is placed around the teeth 19 of the sprocket 13 and teeth of the crankshaft to rotate synchronously with the crankshaft. Thereby, when the engine torque, which is outputted from the crankshaft, is inputted to the sprocket 13 through the timing chain, the driving-side rotator 10 is rotated synchronously with the crankshaft in the clockwise direction in FIGS. 3 and 4.

As shown in FIGS, 1 and 4, the driven-side rotator 20 is configured into a generally cylindrical cup shape and is coaxially received in the driving-side rotator 10. A bottom wall of the driven-side rotator 20 forms a connecting portion 21, which is coaxially connected to the camshaft 2 with screws. Through this connection, the driven-side rotator 20 is rotated together with the camshaft 2 in the clockwise direction in FIGS. 3 and 4. In the present embodiment, the normal rotational direction of the motor shaft 102 is the same direction as the rotational direction of the internal combustion engine (e.g., the rotational direction of the crankshaft), and the reverse rotational direction of the motor shaft 102 is the opposite direction, which is opposite from the rotational direction of the internal combustion engine.

The peripheral wall of the driven-side rotator 20 forms a driven-side internal gear portion 22, which has an addendum circle on a radially inner side of a deddendum circle thereof. Here, an inner diameter of the driven-side internal gear portion 22 is smaller than an inner diameter of the driving-side internal gear portion 14. Furthermore, the number of teeth of the driven-side internal gear portion 22 is smaller than the number of teeth of the driving-side internal gear portion 14. The driven-side internal gear portion 22 is displaced from the driving-side internal gear portion 14 in the axial direction.

As shown in FIGS. 1, 3 and 4, the planetary carrier 40, which serves as an input rotator, is configured into a generally cylindrical tubular body, and an inner peripheral surface of the planetary carrier 40 forms an input portion 41. The input portion 41 is coaxially placed relative to the driving-side rotator 10, the driven-side rotator 20 and the motor shaft 102. Two engaging grooves 42 are formed in the input portion 41 to engage with a joint 43. The shaft main body 104 of the motor shaft 102 is connected to the planetary carrier 40 through the joint 43. Because of the connection made with the joint 43, the planetary carrier 40 is rotated together with the motor shaft 102 in the normal rotational direction or the reverse rotational direction.

Furthermore, an eccentric portion 44, which is eccentric to the input portion 41, is formed by an outer peripheral surface of the planetary carrier 40. The eccentric portion 44 is installed to the inner peripheral side of the center hole 51 of the planetary gear 50 through a bearing 45. The planetary gear

50 is supported by the eccentric portion 44 in such a manner that the planetary gear 50 makes planetary motion in response to the relative rotation of the planetary carrier 40 relative to the driving-side internal gear portion 14. Here, the planetary motion of the planetary gear 50 is made such that the planetary gear 50 revolves in the rotational direction of the planetary carrier 40 while the planetary gear 50 rotates about the eccentric axis of the eccentric portion 44.

The planetary gear 50 is formed into a stepped cylindrical body. Specifically, the planetary gear 50 has a large diameter portion, which forms a driving-side external gear portion 52, and a small diameter portion, which forms a driven-side external gear portion 54. The driving-side external gear portion 52 has an addendum circle on the radially outward of a deddendum circle thereof. Similarly, the driven-side external gear portion 54 has an addendum circle on the radially outward of a deddendum circle thereof. The number of teeth of the driving-side external gear portion 52 is smaller than that of the driving-side internal gear portion 14 by a predetermined number, and the number of teeth of the driven-side external gear portion 54 is smaller than that of the driven-side internal gear portion 22 by the same predetermined number. The driving-side external gear portion 52 is placed radially inward of the driving-side internal gear portion 14 and is meshed with the driving-side internal gear portion 14. The driven-side external gear portion 54, which is located on the connecting portion 21 side of the driving-side external gear portion 52, is placed radially inward of the driven-side internal gear portion 22 and is meshed with the driven-side internal gear portion 22.

The phase adjusting mechanism 8, which includes the driving-side rotator 10 and the driven-side rotator 20 that are meshed with each other in the above described manner, changes the engine phase based on the rotational state of the motor shaft 102 and the planetary carrier 40.

Specifically, in the state where the motor shaft 102 and the planetary carrier 40 are rotated in the normal rotational direction at the same speed as that of the driving-side rotator 10 through the transmission of the engine torque while the planetary carrier 40 does not rotate relative to the driving-side internal gear portion 14, the planetary gear 50 does not make the planetary motion and is rotated together with the driving-side rotator 10 and the driven-side rotator 20. Thus, the current engine phase is maintained.

In contrast, in the state where the motor shaft 102 and the planetary carrier 40 are rotated in the normal rotational direction at the higher speed, which is higher than that of the driving-side rotator 10, to rotate the planetary carrier 40 in an advancing direction relative to the driving-side internal gear portion 14, the driven-side rotator 20 is rotated in the advancing direction relative to the driving-side rotator 10 by the planetary motion of the planetary gear 50. Thus, the engine phase is advanced.

Furthermore, in the state where the motor shaft 102 and the planetary carrier 40 are rotated in the normal rotational direction or the reverse rotational direction at the lower speed, which is lower than that of the driving-side rotator 10, to rotate the planetary carrier 40 in a retarding direction relative to the driving-side internal gear portion 14, the driven-side rotator 20 is rotated in the retarding direction relative to the driving-side rotator 10 by the planetary motion of the planetary gear 50. Thus, the engine phase is retarded.

Hereinafter, a characteristic structure of the valve timing control apparatus 1 will be described.

First, the characteristic structure of the phase adjusting mechanism 8 will be described.

As shown in FIGS. 1 and 4, the phase adjusting mechanism 8 includes a stopper groove 110 and a stopper projection 120 as a stopper. Specifically the sprocket 13 of the driving-side rotator 10 has the stopper groove 110, which opens in the inner peripheral surface of the sprocket 13 of the driving-side rotator 10 and arcuately extends in the rotational direction of the sprocket 13. Furthermore, the driven-side rotator 20 has the stopper projection 120, which outwardly projects in the radial direction of the driven-side internal gear portion 22. The stopper projection 120 is received in the stopper groove 110 in the driving-side rotator 10 and is swingable in the rotational direction of the driving-side rotator 10 and of the driven-side rotator 20.

When a stopper surface 120*a* of the stopper projection 120 abuts against, i.e., is engaged with a stopper surface 110*a* of the stopper groove 110, which is located on the retarding side of the stopper projection 120, the reverse rotation of the motor shaft 102 and the planetary carrier 40, which drive the driven-side rotator 20 in the retarding direction relative to the driving-side rotator 10, is limited. In this way, the engine phase is stopped at the most retarded end phase.

When a stopper surface 120*b* of the stopper projection 120 abuts against, i.e., is engaged with a stopper surface 110*b* of the stopper groove 110, which is located on the advancing side of the stopper projection 120, the normal rotation of the motor shaft 102 and the planetary carrier 40, which drive the driven-side rotator 20 in the advancing direction relative to the driving-side rotator 10, is limited. In this way, the engine phase is stopped at the most advanced end phase.

Figure 5:
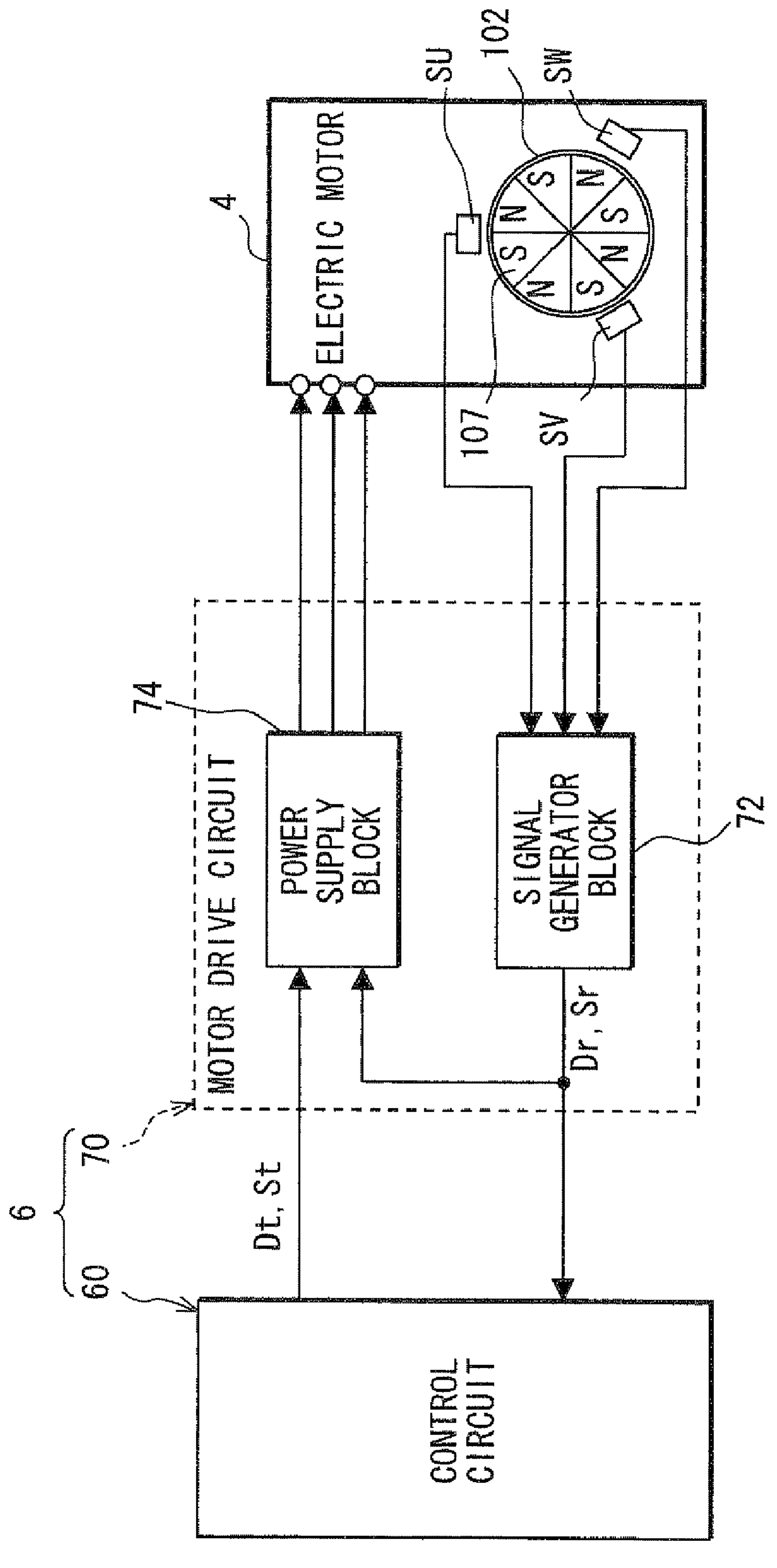
FIG. 5 is a block diagram showing a characteristic structure of an electric power supply control circuit unit shown in FIG. 1.

Next, the characteristic structure of the electric motor 4 will be described. As shown in FIGS. 1 and 5, the electric motor 4 includes three rotational angle sensors SU, SV, SW.

Each rotational angle sensor SU, SV, SW includes, for example, a Hall element. The rotational angle sensors SU, SV, SW are arranged one after another at predetermined angular intervals in the rotational direction of the motor shaft 102. The rotational angle sensors SU, SV, SW sense the magnetic field generated from magnetic poles N, S of sensor magnets 107, which are installed to the motor shaft 102, and thereby output the measurement signals, which indicate the actual rotational angle $\theta$ of the motor shaft 102.

Next, the characteristic structure of the electric power supply control circuit unit 6 will be described. As shown in FIG. 5, the electric power supply control circuit unit 6 includes a control circuit 60 and a motor drive circuit 70. The control circuit 60 is placed outside of the electric motor 4, and the motor drive circuit 70 is placed inside of the electric motor 4. Here, it should be noted that both of the control circuit 60 and the motor drive circuit 70 may be collectively placed inside or outside of the electric motor 4.

The control circuit 60 includes a microcomputer as its major component and is electrically connected to the motor drive circuit 70. The control circuit 60 has a function of controlling the internal combustion engine and also has a function of controlling the electric power supply to the electric motor 4. Specifically, the control circuit 60 computes the actual valve timing based on an actual rotational direction Dr and an actual rotational speed (the number of rotations per unit time) Sr of the motor shaft 102, which are received from the motor drive circuit 70. Furthermore, the control circuit 60 computes the target valve timing based on the operational state of the internal combustion engine. Furthermore, the control circuit 60 sets the target rotational direction Dt and the target rotational speed St based on the computed actual valve timing and the target valve timing and outputs the control signal, which indicates the result of the setting, to the motor drive circuit 70.

The motor drive circuit 70 has a signal generator block 72 and an electric power supply block 74. In the present embodiment, each of these blocks 72, 74 is implemented by the corresponding hardware, which includes dedicated electric circuit elements.

The signal generator block 72 is electrically connected to the respective rotational angle sensors SU, SV, SW, the control circuit 60 and the electric power supply block 74. The signal generator block 72 computes the actual rotational direction Dr and the actual rotational speed Sr of the motor shaft 102 based on the measurement signals of the respective rotational angle sensors SU, SV, SW, which indicate the actual rotational angle θ of the motor shaft 102. Then, the signal generator block 72 outputs the motor rotation signal, which indicates the result of the above computation, to the control circuit 60 and the electric power supply block 74.

Figure 6:
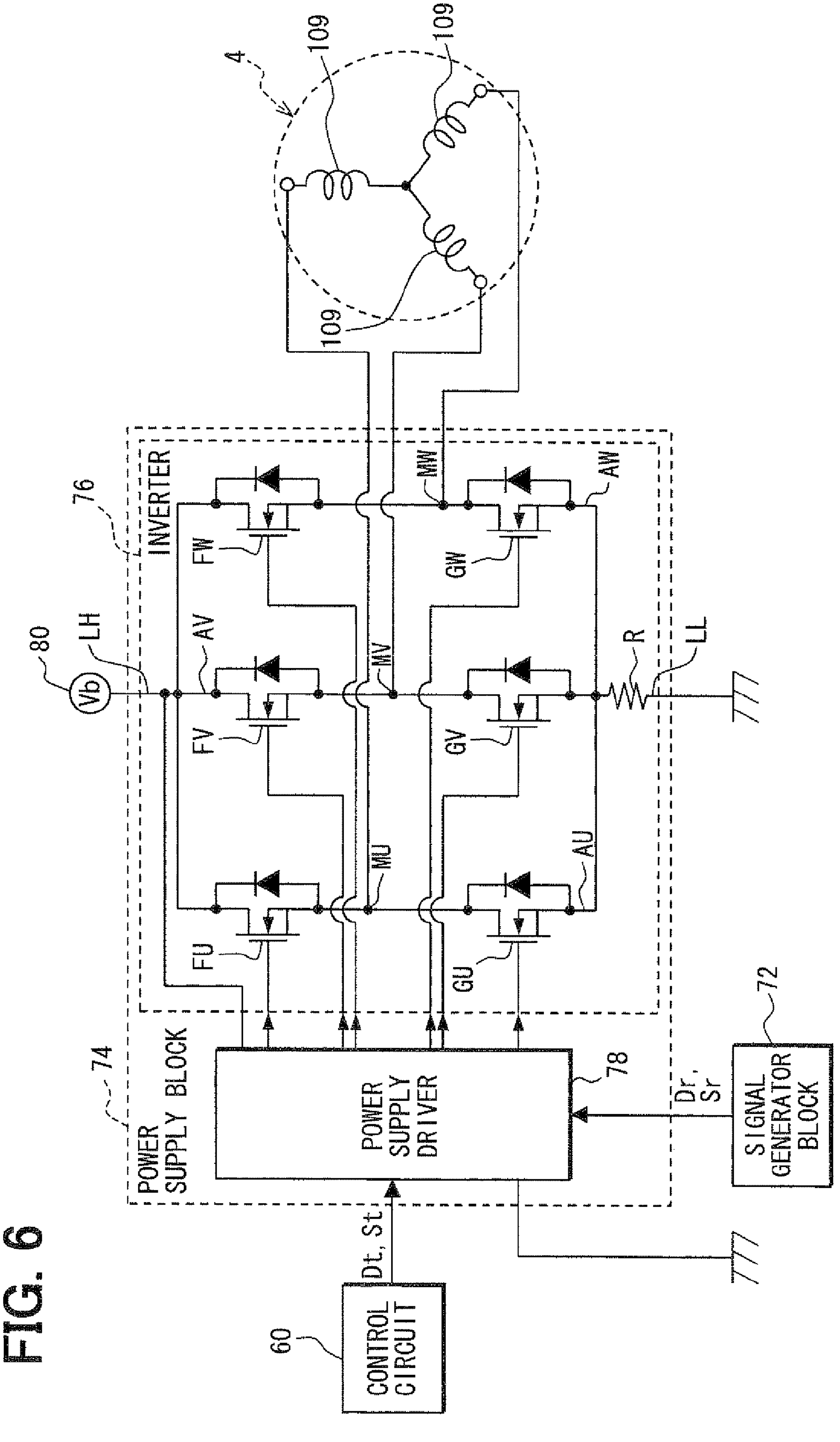
FIG. 6 is a block diagram, showing a detailed structure of an electric power supply block of FIG. 5.

As shown in FIG. 6, the electric power supply block 74 includes an inverter 76 and an electric power supply driver 78.

The inverter 76 includes a thee-phase bridge circuit, which has three arms AU, AV, AW. The arm AU connects between a corresponding upper switching element FU and a corresponding lower switching element GU. The arm AV connects between a corresponding upper switching element FV and a corresponding lower switching element GV. Furthermore, the arm AW connects between a corresponding upper switching element FW and a corresponding lower switching element GW. An upper switching element FU, FV, FW side end of each arm AU, AV, AW is electrically connected to a battery 80 of the vehicle, which serves as an electric power source, through a high voltage side power line LH. In contrast, a lower switching element GU, GV, GW side end of each arm AU, AV, AW is grounded through a load resistor R and a lower voltage side power line LL. With the above construction, each arm AU, AV, AW is constructed such that the corresponding upper switching element FU, FV, FW and the corresponding lower switching element GU, GV, GW are connected in series to the battery 80.

In the present embodiment, each of the switching elements FU, FV, FW, GU, GV, GW, which constitute the arms AU, AV, AW, is a field-effect transistor. This field-effect transistor is turned on by a high voltage drive signal and is turned off by a low voltage drive signal. An intermediate point MU, MV, MW of each arm AU, AV, AW between the high voltage side upper switching element FU, FV, FW and the low voltage side lower switching element GU, GV, GW is electrically connected to a corresponding one of stator coils 109 through a star connection (a wye connection).

In the present embodiment, the electric power supply driver 78, which serves as an electric power supply driving means, is an integrated circuit (IC) and is S electrically connected to the control circuit 60, the signal generator block 72 and the respective switching elements FU, FV, FW, GU, GV, GW. The electric power supply driver 78 individually turns on and turns off the respective switching elements FU, FV, FW, GU, GV, GW based on the target rotational direction Dt and the target rotational speed St, which are supplied from the control circuit 60, and the actual rotational direction Dr and the actual rotational speed Sr, which are supplied from the signal generator block 72. Therefore, when the switching elements EU, FV, FW, GU, GV, GW are sequentially turned on to sequentially excite the stator coils 109 in a predetermined order, a torque (hereinafter, referred to as a motor torque), which acts on the rotor 105, is generated, so that the motor shaft 102 is rotated.

Hereinafter, a characteristic operation of the valve timing control apparatus 1 will be described.

As shown in FIGS. 7 and 8, the electric power supply driver 78 changes a combination pattern i-vi (hereinafter, referred to as a power supply pattern) of the voltage levels of the drive signals, which are supplied to the switching elements EU, FV, FW, GU, GV, GW, to adjust the motor torque. In the respective patterns i-vi shown in FIGS. 7 and 8, each case, in which the voltage level of the drive signal is successively maintained to the high level, is indicated by "H", and each case, in which the voltage level of the drive signal is successively maintained to the low level, is indicated by "L". Furthermore, each case, in which the voltage level of the drive signal is duty controlled through the pulse width modulation, is indicated by "P".

Specifically, in one case, the actual rotational direction Dr may be the normal rotational direction, and the target rotational direction Dt may be the normal rotational direction. In such a case, the electric power supply driver 78 sequentially changes the power supply patterns i-vi of FIG. 7 one after another in a forward direction (a top-to-bottom direction indicated by "F" in FIG. 7) to generate the motor torque in the normal rotational direction of the motor shaft 102, which is the current actual rotational direction of the motor shaft 102. In another case, the actual rotational direction Dr may be the reverse rotational direction, and the target rotational direction Dt may be the reverse rotational direction. In such a case, the electric power supply driver 78 sequentially changes the power supply patterns i-vi of FIG. 8 one after another in a backward direction (a bottom-to-top direction indicated by "B" in FIG. 8) to generate the motor torque in the reverse rotational direction of the motor shaft 102, which is the current actual rotational direction of the motor shaft 102.

In each of the above two cases where the actual rotational direction Dr and the target rotational direction Dt coincide with each other, the electric power supply driver 78 variably controls the on-duty ratio Don of the drive signal of each corresponding selected one (serving as a selected switching element) of the lower switching elements GU, GV, GW, which is selected in the corresponding power supply pattern i-vi, based on a difference between the target rotational speed St and the actual rotational speed Sr of the motor shaft 102, as shown in FIG. 9. Here, as shown in FIG. 10, the on-duty ratio Don is a ratio (%) of an on-time period Ton, during which the corresponding lower switching element GU, GV, GW is successively turned on by applying the high voltage (H), relative to one complete cyclic period Tdrv of the drive signal.

In the above cases where the actual rotational direction Dr and the target rotational direction Dt coincide with each other, the above duty control for each selected one of the lower switching elements GU, GV, GW, which is selected in the corresponding power supply pattern i-vi, is followed, so that the motor shaft 102 is driven in the target rotational direction Dt. Thus, the engine phase is adjusted in response to this rotational state of the motor shaft 102. At this time, the amount of electric current, which flows through each energized one (the on-state switching element that is in the on-state) of the switching elements FU, FV, FW, GU, GV, GW, corresponds to a difference between the applied voltage, which is applied to the corresponding stator coil 109, and the induced voltage, which is generated at that coil 109. Therefore, the valve timing is continuously adjusted in the appropriate manner in conformity with the operational state of the internal combustion engine while the amount of electric current, which flows in each corresponding switching element FU, FV, FW, GU, GV, GW, is lowered to avoid the thermal failure.

In another case, the actual rotational direction Dr may be the reverse rotational direction, and the target rotational direction Dt may be the normal rotational direction. In such a case, the electric power supply driver 78 sequentially changes the power supply patterns i-vi of FIG. 7 in the backward direction (a bottom-to-top direction indicated by “B” in FIG. 7) to generate the motor torque in the normal rotational direction of the motor shaft 102, which is opposite from the current actual rotational direction (the reverse rotational direction) of the motor shaft 102, so that the brake force is applied to the motor shaft 102 in the normal rotational direction. In another case, the actual rotational direction Dr may be the normal rotational direction, and the target rotational direction Dt may be the reverse rotational direction. In such a case, the electric power supply driver 78 changes the power supply patterns i-vi of FIG. 8 in the forward direction (a top-to-bottom direction indicated by “F” in FIG. 8) to generate the motor torque in the reverse rotational direction of the motor shaft 102, which is opposite from the current actual rotational direction (normal rotational direction) of the motor shaft 102, so that the brake force is applied to the motor shaft 102 in the reverse rotational direction.

Even in each of the above cases where the actual rotational direction Dr and the target rotational direction Dt do not coincide with each other, the electric power supply driver 78 forcefully controls the on-duty ratio Don to a predetermined value Dons for the drive signal of each selected one of the lower switching elements GU, GV, GW, which is selected in the corresponding power supply pattern i-vi, as shown in FIG. 9. Here, as shown in FIG. 11, the value Dons is set to be smaller than a lower limit value DonI (e.g., 5%), which is at least required to rotate the motor shaft 102 through the power supply to the corresponding stator coils 109. In this way, the motor shaft 102 is not rotated through the power supply to the stator coils 109. Most preferably, the value Dons is set to be zero (0%), which is less than the lower limit value DonI. This is due to the following reason. That is, when the on-duty ratio Don is set to zero to successively maintain the low voltage level of the drive signal, it is possible to limit the occurrence of a discrepancy in the on/off state among the lower switching elements GU, GV, GW.

As described above, in the case where the actual rotational direction Dr and the target rotational direction Dt do not coincide with each other, the on-duty ratio Don of the drive signal of each selected one of the lower switching elements GU, GV, GW, which is selected in the corresponding power supply pattern i-vi, is controlled to the predetermined value, i.e., the on-duty ratio Dons, so that the induced voltage is generated in each corresponding stator coil 109. Therefore, the induced voltage is consumed through, for example, the load resistance element (resistor) R and the stator coils 109, and thereby the brake force is applied to the motor shaft 102 in the target rotational direction Dt. Thus, the engine phase is changed. At this time, the applied voltage, which is applied to the corresponding stator coil 109, is limited to the low voltage, which corresponds to the on-duty ratio Dons. Therefore, the amount of electric current, which flows in response to the sum of the applied voltage and the induced voltage of each energized one (the on-state switching element that is in the on-state) of the switching elements FU, FV, FW, GU, GV, GW, is rapidly limited. Particularly, in the case where the on-duty ratio Dons is zero, the applied voltage, which is applied to the corresponding stator coil 109, disappears, so that the electric current, the amount of which is substantially limited to the amount that corresponds to the induced voltage, is supplied only to each corresponding upper switching element FU, FV, FW. Thereby, the occurrence of the thermal failure, which would occur upon successive application of the large electric current to the switching element FV, FW, GU, GV, GW, can be limited without using a dedicated short-circuit, and the appropriate valve timing, which is appropriate for the operational state of the internal combustion engine, can be implemented.

In the present embodiment, the stopper surface **110*a* of the stopper groove 110 and the stopper surface 120*a* of the stopper projection 120 are engaged with each other in, for example, the constant steady operational period of the internal combustion engine, so that the engine phase is held in the most retarded end phase to improve the fuel consumption and the output power of the internal combustion engine. Furthermore, in the present embodiment, the stopper surface 110*a* of the stopper groove 110 and the stopper surface 120*a* of the stopper projection 120 are engaged with each other, for example, right after the starting (cranking) of the internal combustion engine to hold the engine phase in the most retarded end phase. In this state, this phase end may be learned as a zero point (a reference point) of the engine phase. In the case where the engine phase is held in the most retarded end phase, the target rotational direction Dt is set to the reverse rotational direction while the motor shaft 102 is rotated in the normal rotational direction to successively generate the brake force. In such a case, the electric current, which flows through each corresponding switching element FU, FV, FW, GU, GV, GW, is limited, as discussed above. Thus, even in the case where the electric current is successively supplied to the switching element FU, FV, FW, GU, GV, GW, the thermal failure of the switching element FU, FV, FW, GU, GV, GW can be limited, and the power consumption of the battery 80** can be reduced.

In addition, in the present embodiment, in which the electric motor 4 is driven by changing the power supply patterns i-vi shown FIG. 7 or 8 one after another, the one of the arms AU, AV, AW, in which the corresponding one of the upper switching elements FU, FV, FW is turned on, is different from the one of the arms AU, AV, AW, in which the corresponding one of the lower switching elements GU, GV, GW is turned on. Specifically, in the on-period of each of the upper switching elements FU, FV, FW, the lower switching element GU, GV, GW, which belongs to the same arm as this upper switching element FU, FV, FW, is never turned on. Therefore, even in this way, the supply of the large electric current to the switching elements FU, FV, FW, GU, GV, GW can be limited to limit the thermal failure.

As described above, the valve timing control apparatus 1 of the present embodiment can achieve the appropriate adjustment of the valve timing while effectively limiting of the thermal failure.

Now, modifications of the embodiment will be described.

The present invention has been described with respect to the one embodiment of the present invention. However, the present invention is not limited to the above embodiment, and the above embodiment may be modified in various ways within a spirit and scope of the present invention.

For example, in the above embodiment, each corresponding one of the lower switching elements GU, GV, GW, is selected as the selected switching element. Alternatively, each corresponding one of the upper switching elements FU, FV, FW may be selected as the selected switching element. In such a case, each corresponding one of the lower switching elements GU, GV, GW is controlled to be successively turned on in the manner similar to that of each corresponding one of the upper switching elements FU, FV, FW. Further alternatively, both of the lower switching elements GU, GV, GW and the upper switching elements FU, FV, FW may be used as the selected switching elements. In such a case, each corresponding one of the upper switching elements FU, FV, FW is duty controlled through the pulse width modulation in a manner similar to that of the lower switching elements GU, GV, GW.

In the case where the actual rotational direction Dr is the reverse rotational direction, and the target rotational direction Dt is the normal rotational direction, the on-duty ratio Don may be variably controlled in a manner similar to the case where the actual rotational direction Dr and the target rotational direction coincide with each other instead of setting the on-duty ratio Don to the predetermined value Dons. That is, only in the case where the actual rotational direction Dr is the normal rotational direction, and the target rotational direction Dt is the reverse rotational direction, the on-duty ratio Don may be set to the predetermined value Dons. Furthermore, in the state where the stopper surface 110*b* of the stopper groove 110 and the stopper surface 120*b* of the stopper projection 120 are engaged with each other to hold the engine phase in the most advanced end phase, and this end phase may be learned as the zero point (reference point) of the engine phase.

The electric motor 4 may be any other suitable electric motor other than the three-phase permanent magnet synchronous motor described in the above embodiment as long as the effects and advantages of the above described electric motor 4 can be achieved Furthermore, the stator coils 109 may be connected by any other way, such as a delta connection, which is other than the star connection.

The electric power supply control circuit unit 6 may have any other type of structure, which is other than the above described one, in which the two circuits 60, 70 are combined, as long as the effects and advantages of the electric power supply control circuit unit 6 described above can be achieved. Specifically, a single electric circuit may be provided to implement the functions of both of the two circuits 60, 70. Furthermore, some (e.g., the function of the electric power supply driver 78) of the functions of the motor drive circuit 70 may be implemented by a microcomputer. Also, the inverter 76 of the motor drive circuit 70 may be modified such that the number of arms corresponds to the number of the phases of the utilized electric motor 4. Furthermore, in the inverter 76, each arm may be constructed from other switching elements, such as bipolar transistors, which are other than the field-effect transistors.

The phase adjusting mechanism 8 may have any other type of structure, which is other than the above described structure, in which the driving-side internal gear portion 14 of the driving-side rotator 10 and the driven-side internal gear portion 22 of the driven-side rotator 20 are meshed with the planetary gear 50, as long as the effects and advantages of the above described phase adjusting mechanism 8 can be achieved. Specifically, the gear portion of one of the driving-side rotator 10 and the driven-side rotator 20 is meshed with the planetary gear, and the other one of the driving-side rotator 10 and the driven-side rotator 20 is rotated in response to the planetary motion of the planetary gear. Furthermore, when the motor shaft 102 is rotated in the normal rotational direction at the higher rotational speed, which is higher than that of the driving-side rotator 10, the engine phase may be retarded. Also, when the motor shaft 102 is rotated in the normal rotational direction or the reverse rotational direction at the lower rotational speed, which is lower than that of the driving-side rotator 10, the engine phase may be advanced.

The present invention is also applicable to any other type of valve timing control apparatus, which controls valve timing of exhaust valves or which controls both of the valve timing of the intake valves and the valve timing of the exhaust valves.

Additional advantages and modifications will readily occur to those skilled in the art. The invention in its broader terms is therefore not limited to the specific details, representative apparatus, and illustrative examples shown and described.

What is claimed is:

1. A valve timing control apparatus that controls valve timing of at least one valve of an internal combustion engine, which is driven by a camshaft upon transmission of a torque from a crankshaft of the internal combustion engine to open and close the at least one valve, the valve timing control apparatus comprising:

- an electric motor that includes:
  - a plurality of stator coils, each of which generates a magnetic field upon energization thereof; and
  - a motor shaft, which is driven to rotate by action of the magnetic field of each corresponding one of the plurality of stator coils;
- a plurality of switching elements, each of which is connected to a corresponding one of the plurality of stator coils;
- an electric power supply driving means for driving the motor shaft by sequentially changing at least one on-state switching element to be turned on among the plurality of switching elements to supply electric power to each corresponding one of the plurality of stator coils; and
- a phase adjusting mechanism that adjusts a relative phase between the crankshaft and the camshaft in response to a rotational state of the motor shaft, wherein:
- the electric power supply driving means executes duty control of turning on and off of a selected switching element, which is selected from the at least one on-state switching element, to supply the electric power to the corresponding one of the plurality of stator coils in a case where an actual rotational direction of the motor shaft and a target rotational direction of the motor shaft coincide with each other;
- the electric power supply driving means sets an on-duty ratio of the selected switching element below a lower limit value, which is at least required to rotate the motor shaft through the power supply to each corresponding one of the plurality of stator coils, in a case where the actual rotational direction of the motor shaft and the target rotational direction of the motor shaft do not coincide with each other;
- the phase adjusting mechanism includes an input rotator that is rotated in a normal rotational direction by the transmission of the torque from the crankshaft and is rotatable together with the motor shaft in the normal rotational direction or a reverse rotational direction;
- the phase adjusting mechanism adjusts the relative phase in response to the rotational state of the motor shaft and the input rotator; and
- the electric power supply driving means sets the on-duty ratio of the selected switching element below the lower limit value in a case where the actual rotational direction of the motor shaft is the normal rotational direction, and the target rotational direction of the motor shaft is the reverse rotational direction.

2. The valve timing control apparatus according to claim 1, where the electric power supply driving means sets the on-duty ratio to zero, which is below the lower limit value, in the case where the actual rotational direction of the motor shaft and the target rotational direction of the motor shaft do not coincide with each other.

3. A valve timing control apparatus that controls valve timing of at least one valve of an internal combustion engine, which is driven by a camshaft upon transmission of a torque from a crankshaft of the internal combustion engine to open and close the at least one valve, the valve timing control apparatus comprising:

an electric motor that includes:

a plurality of stator coils, each of which generates a magnetic field upon energization thereof; and a motor shaft, which is driven to rotate by action of the magnetic field of each corresponding one of the plurality of stator coils;

a plurality of switching elements, each of which is connected to a corresponding one of the plurality of stator coils;

an electric power supply driving means for driving the motor shaft by sequentially changing at least one on-state switching element to be turned on among the plurality of switching elements to supply electric power to each corresponding one of the plurality of stator coils; and a phase adjusting mechanism that adjusts a relative phase between the crankshaft and the camshaft in response to a rotational state of the motor shaft, wherein:

the electric power supply driving means executes duty control of turning on and off of a selected switching element, which is selected from the at least one on-state switching element, to supply the electric power to the corresponding one of the plurality of stator coils in a case where an actual rotational direction of the motor shaft and a target rotational direction of the motor shaft coincide with each other;

the electric power supply driving means sets an on-duty ratio of the selected switching element below a lower limit value, which is at least required to rotate the motor shaft through the power supply to each corresponding one of the plurality of stator coils, in a case where the actual rotational direction of the motor shaft and the target rotational direction of the motor shaft do not coincide with each other;

the phase adjusting mechanism includes a stopper, which limits rotation of the input rotor in the reverse rotational direction to hold the relative phase at a corresponding phase end.

4. The valve timing control apparatus according to claim 3, where the electric power supply driving means sets the on-duty ratio to zero, which is below the lower limit value, in the case where the actual rotational direction of the motor shaft and the target rotational direction of the motor shaft do not coincide with each other.

5. A valve timing control apparatus that controls valve timing of at least one valve of an internal combustion engine, which is driven by a camshaft upon transmission of a torque from a crankshaft of the internal combustion engine to open and close the at least one valve, the valve timing control apparatus comprising:

an electric motor that includes:

a plurality of stator coils, each of which generates a magnetic field upon energization thereof; and a motor shaft, which is driven to rotate by action of the magnetic field of each corresponding one of the plurality of stator coils;

a plurality of switching elements, each of which is connected to a corresponding one of the plurality of stator coils;

an electric power supply driving means for driving the motor shaft by sequentially changing at least one on-state switching element to be turned on among the plurality of switching elements to supply electric power to each corresponding one of the plurality of stator coils; and a phase adjusting mechanism that adjusts a relative phase between the crankshaft and the camshaft in response to a rotational state of the motor shaft, wherein:

the electric power supply driving means executes duty control of turning on and off of a selected switching element, which is selected from the at least one on-state switching element, to supply the electric power to the corresponding one of the plurality of stator coils in a case where an actual rotational direction of the motor shaft and a target rotational direction of the motor shaft coincide with each other;

the electric power supply driving means sets an on-duty ratio of the selected switching element below a lower limit value, which is at least required to rotate the motor shaft through the power supply to each corresponding one of the plurality of stator coils, in a case where the actual rotational direction of the motor shaft and the target rotational direction of the motor shaft do not coincide with each other;

wherein the valve timing control apparatus further comprises a plurality of arms, in each of which a corresponding high voltage side switching element selected from the plurality of switching elements and a corresponding low voltage side switching element selected from the plurality of switching elements are connected in series with respect to an electric power source, and a corresponding one of the plurality of stator coils is connected to an intermediate point of the arm between the high voltage side switching element and the low voltage side switching element, wherein while the electric power supply driving means turns on one of the high voltage side switching element and the low voltage side switching element in one of the plurality of arms, the electric power supply driving means selects the other one of the high voltage side switching element and the low voltage side switching element of another one of the plurality of arms as the selected switching element.

6. The valve timing control apparatus according to claim 5, where the electric power supply driving means sets the on-duty ratio to zero, which is below the lower limit value, in the case where the actual rotational direction of the motor shaft and the target rotational direction of the motor shaft do not coincide with each other.

* * * * *